US008374896B2

(12) United States Patent
Engler et al.

(10) Patent No.: US 8,374,896 B2

(45) Date of Patent: Feb. 12, 2013

(54) ARCHITECTURAL DESIGN FOR OPPORTUNITY MANAGEMENT APPLICATION SOFTWARE

(75) Inventors: Christoph Engler, Walldorf (DE); Helge Schulte, St. Ingbert (DE); Ingo Pfitzner, Berlin (DE); Priya Mohana, Bangalore (IN); Wolfgang Gentes, Zweibruecken (DE); Shadab Shafiq, New Delhi (IN); Naga Chandra Sekhar Hota, Bangalore (IN); Andre Wachholz-Prill, Speyer (DE); Martina Lahr, Weinheim (DE); Andrea Sudbrack, Heidelberg (DE)

(73) Assignee: SAP AG, Walldorf (DE)

(*) Notice: Subject to any disclaimer, the term of this patent is extended or adjusted under 35 U.S.C. 154(b) by 913 days.

(21) Appl. No.: 12/233,075

(22) Filed: Sep. 18, 2008

(65) Prior Publication Data

US 2010/0070329 A1 Mar. 18, 2010

(51) Int. Cl.

| | |
|---|---|
| ***G06F 9/44*** | (2006.01) |
| ***G06F 17/50*** | (2006.01) |
| ***G06F 9/46*** | (2006.01) |
| ***G05B 19/418*** | (2006.01) |

(52) U.S. Cl. .................................................. 705/7; 705/8

(58) Field of Classification Search ................... 705/7, 8

See application file for complete search history.

(56) References Cited

U.S. PATENT DOCUMENTS 4,947,321 A 8/1990 Spence et al.
5,361,198 A * 11/1994 Harmon et al. ................. 700/83
5,452,459 A * 9/1995 Drury et al. ........................... 1/1
5,550,734 A 8/1996 Tarter et al.
5,560,005 A 9/1996 Hoover et al.
5,566,097 A 10/1996 Myers et al.

(Continued)

FOREIGN PATENT DOCUMENTS

WO 00/23874 4/2000
WO WO 2004/083984 9/2004

(Continued)

OTHER PUBLICATIONS

Component model Optimization by Bin Wu 2004 IEEE Int Conf on systems, Man &Cybermatics, 0-7803-8566-7/04 pp. 1158-1163.*

(Continued)

*Primary Examiner* — Matthew Gart
*Assistant Examiner* — Harshad Parikh
(74) *Attorney, Agent, or Firm* — Fish & Richardson P.C.

(57) ABSTRACT

Methods, systems, and apparatus, including computer program products, for implementing a software architecture design for a software application implementing ad-hoc goods movement. The application is structured as multiple process components interacting with each other through service interfaces, and multiple service operations, each being implemented for a respective process component. The process components include, for example, a lead processing process component that handles the potential interests of a business partner and the interactions with the business partner over a certain timeframe; an opportunity processing process component that handles the development, processing, and monitoring of opportunities; a customer quote processing process component that handles the processing of quotes to customers offering the delivery of goods according to specific terms; and a sales order processing process component that handles the processing of customers' requests to seller for delivery of goods, on a specific date, for a specific quantity, and for a specific price.

18 Claims, 8 Drawing Sheets

U.S. PATENT DOCUMENTS 5,586,312 A 12/1996 Johnson et al.
5,590,277 A 12/1996 Fuchs et al.
5,632,022 A 5/1997 Warren et al.
5,634,127 A 5/1997 Cloud et al.
5,680,619 A 10/1997 Gudmundson et al.
5,704,044 A 12/1997 Tarter et al.
5,710,917 A 1/1998 Musa et al.
5,768,119 A 6/1998 Havekost et al.
5,822,585 A 10/1998 Noble et al.
5,832,218 A 11/1998 Gibbs et al.
5,848,291 A 12/1998 Milne et al.
5,867,495 A 2/1999 Elliott et al.
5,870,588 A * 2/1999 Rompaey et al. ............... 703/13
5,881,230 A 3/1999 Christensen et al.
5,893,106 A 4/1999 Brobst et al.
5,898,872 A * 4/1999 Richley ......................... 717/121
5,918,219 A 6/1999 Isherwood
5,987,247 A 11/1999 Lau
5,991,536 A 11/1999 Brodsky et al.
H001830 H 1/2000 Petrimoulx et al.
6,028,997 A 2/2000 Leymann et al.
6,038,393 A * 3/2000 Iyengar et al. ................ 717/104
6,049,838 A 4/2000 Miller et al.
6,067,559 A 5/2000 Allard et al.
6,070,197 A 5/2000 Cobb et al.
6,078,944 A * 6/2000 Enko et al. .................... 718/105
6,112,024 A 8/2000 Almond et al.
6,151,582 A 11/2000 Huang et al.
6,167,563 A 12/2000 Fontana et al.
6,167,564 A 12/2000 Fontana et al.
6,177,932 B1 1/2001 Galdes et al.
6,182,133 B1 1/2001 Horvitz
6,192,390 B1 * 2/2001 Berger et al. ................. 709/200
6,208,345 B1 3/2001 Sheard et al.
6,237,136 B1 * 5/2001 Sadahiro ....................... 717/110
6,272,672 B1 8/2001 Conway
6,311,170 B1 10/2001 Embrey
6,338,097 B1 1/2002 Krenzke et al.
6,424,991 B1 7/2002 Gish
6,434,740 B1 8/2002 Monday et al.
6,442,748 B1 8/2002 Bowman-Amuah
6,445,782 B1 9/2002 Elfe et al.
6,446,045 B1 9/2002 Stone et al.
6,446,092 B1 9/2002 Sutter
6,473,794 B1 10/2002 Guheen et al.
6,493,716 B1 12/2002 Azagury et al.
6,571,220 B1 5/2003 Ogino et al.
6,594,535 B1 7/2003 Costanza
6,601,233 B1 7/2003 Underwood
6,601,234 B1 7/2003 Bowman-Amuah
6,606,744 B1 8/2003 Mikurak
6,609,100 B2 8/2003 Smith et al.
6,640,238 B1 10/2003 Bowman-Amuah
6,671,673 B1 12/2003 Baseman et al.
6,678,882 B1 1/2004 Hurley et al.
6,687,734 B1 2/2004 Sellink et al.
6,691,151 B1 2/2004 Cheyer et al.
6,721,783 B1 4/2004 Blossman et al.
6,738,964 B1 5/2004 Zink et al.
6,747,679 B1 6/2004 Finch et al.
6,750,885 B1 6/2004 Finch et al.
6,757,837 B1 6/2004 Platt et al.
6,764,009 B2 7/2004 Melick et al.
6,772,216 B1 8/2004 Ankireddipally et al.
6,782,536 B2 * 8/2004 Moore et al. .................. 719/310
6,789,252 B1 9/2004 Burke et al.
6,845,499 B2 * 1/2005 Srivastava et al. ............ 717/100
6,847,854 B2 1/2005 Discenzo
6,859,931 B1 2/2005 Cheyer et al.
6,889,197 B2 5/2005 Lidow
6,889,375 B1 5/2005 Chan et al.
6,895,438 B1 5/2005 Ulrich
6,898,783 B1 5/2005 Gupta et al.
6,904,399 B2 6/2005 Cooper et al.
6,907,395 B1 6/2005 Hunt et al.
6,954,736 B2 10/2005 Menninger et al.
6,985,939 B2 1/2006 Fletcher et al.
6,990,466 B1 1/2006 Hu
7,003,474 B2 2/2006 Lidow
7,031,998 B2 4/2006 Archbold
7,043,448 B2 5/2006 Campbell
7,047,518 B2 5/2006 Little et al.
7,050,056 B2 5/2006 Meyringer
7,050,873 B1 5/2006 Discenzo
7,055,136 B2 5/2006 Dzoba et al.
7,058,587 B1 6/2006 Horne
7,069,536 B2 6/2006 Yaung
7,072,855 B1 7/2006 Godlewski et al.
7,076,766 B2 7/2006 Wirts et al.
7,100,195 B1 * 8/2006 Underwood ...................... 726/2
7,103,873 B2 9/2006 Tanner et al.
7,117,447 B2 10/2006 Cobb et al.
7,120,597 B1 10/2006 Knudtzon et al.
7,120,896 B2 10/2006 Budhiraja et al.
7,131,069 B1 10/2006 Rush et al.
7,149,887 B2 12/2006 Morrison et al.
7,155,403 B2 * 12/2006 Cirulli et al. .................... 705/17
7,155,409 B1 12/2006 Stroh
7,181,694 B2 2/2007 Reiss et al.
7,184,964 B2 2/2007 Wang
7,194,431 B1 3/2007 Land et al.
7,197,740 B2 3/2007 Beringer et al.
7,200,569 B2 4/2007 Gallagher et al.
7,206,768 B1 4/2007 deGroeve et al.
7,213,232 B1 5/2007 Knowles
7,216,091 B1 5/2007 Blandina et al.
7,219,107 B2 5/2007 Beringer
7,222,786 B2 5/2007 Renz et al.
7,225,240 B1 5/2007 Fox et al.
7,249,044 B2 7/2007 Kumar et al.
7,257,254 B2 8/2007 Tunney
7,283,973 B1 10/2007 Loghmani et al.
7,293,254 B2 11/2007 Bloesch et al.
7,299,970 B1 11/2007 Ching
7,315,830 B1 1/2008 Wirtz et al.
7,322,024 B2 * 1/2008 Carlson et al. ................ 717/120
7,324,966 B2 1/2008 Scheer
7,353,180 B1 4/2008 Silverstone et al.
7,356,492 B2 4/2008 Hazi et al.
7,367,011 B2 4/2008 Ramsey et al.
7,370,315 B1 5/2008 Lovell et al.
7,376,601 B1 5/2008 Aldridge
7,376,604 B1 5/2008 Butcher
7,376,632 B1 5/2008 Sadek et al.
7,383,201 B2 6/2008 Matsuzaki et al.
7,386,833 B2 6/2008 Granny et al.
7,406,716 B2 7/2008 Kanamori et al.
7,415,697 B1 8/2008 Houlding
7,418,409 B1 8/2008 Goel
7,418,424 B2 8/2008 Martin et al.
7,424,701 B2 * 9/2008 Kendall et al. ................ 717/105
7,433,979 B2 * 10/2008 Need .............................. 710/33
7,448,022 B1 11/2008 Ram et al.
7,451,432 B2 11/2008 Shukla et al.
7,460,654 B1 12/2008 Jenkins et al.
7,461,030 B2 12/2008 Hibler et al.
7,469,233 B2 12/2008 Shooks et al.
7,516,088 B2 * 4/2009 Johnson et al. ................. 705/16
7,523,054 B2 4/2009 Tyson-Quah
7,529,699 B2 5/2009 Fuse et al.
7,536,325 B2 5/2009 Randell et al.
7,536,354 B1 5/2009 deGroeve et al.
7,546,520 B2 6/2009 Davidson et al.
7,546,575 B1 6/2009 Dillman et al.
7,565,640 B2 7/2009 Shukla et al.
7,574,694 B2 * 8/2009 Mangan et al. ............... 717/123
7,624,371 B2 11/2009 Kulkarni et al.
7,631,291 B2 12/2009 Shukla et al.
7,640,195 B2 12/2009 Von Zimmermann et al.
7,640,291 B2 12/2009 Maturana et al.
7,644,390 B2 1/2010 Khodabandehloo et al.
7,657,406 B2 2/2010 Tolone et al.
7,657,445 B1 2/2010 Goux
7,665,083 B2 2/2010 Demant et al.
7,668,761 B2 2/2010 Jenkins et al.
7,672,888 B2 3/2010 Allin et al.
7,681,176 B2 3/2010 Wills et al.

7,685,022 B1* 3/2010 Heyworth et al. .......... 705/26.8
7,693,586 B2 4/2010 Dumas et al.
7,703,073 B2 4/2010 Illowsky et al.
7,739,160 B1 6/2010 Ryan et al.
7,742,985 B1 6/2010 Digrigoli et al.
7,747,980 B2 6/2010 Illowsky et al.
7,765,156 B2 7/2010 Staniar et al.
7,765,521 B2 7/2010 Bryant
7,788,145 B2 8/2010 Wadawadigi et al.
7,788,319 B2 8/2010 Schmidt
7,793,256 B2* 9/2010 Charisius et al. ............ 717/103
7,793,258 B2 9/2010 Sundararajan et al.
7,797,698 B2 9/2010 Diament et al.
7,814,142 B2 10/2010 Mamou et al.
7,822,682 B2 10/2010 Arnold et al.
7,835,971 B2 11/2010 Stockton et al.
7,886,041 B2 2/2011 Outhred et al.
7,895,568 B1* 2/2011 Goodwin et al. ............ 717/108
7,904,350 B2 3/2011 Ayala et al.
7,912,755 B2* 3/2011 Perry et al. .................. 705/26.8
7,917,889 B2 3/2011 Devarakonda et al.
7,925,985 B2 4/2011 Moore
8,001,519 B2* 8/2011 Conallen et al. ............. 717/105
8,010,938 B2 8/2011 Elaasar
8,051,332 B2* 11/2011 Zakonov et al. ............ 714/38.1
8,091,065 B2 1/2012 Mir et al.
8,112,738 B2 2/2012 Pohl et al.
2001/0052108 A1* 12/2001 Bowman-Amuah ............. 717/1
2002/0026394 A1 2/2002 Savage et al.
2002/0042756 A1 4/2002 Kumar et al.
2002/0049622 A1 4/2002 Lettich et al.
2002/0073114 A1 6/2002 Nicastro et al.
2002/0078046 A1* 6/2002 Uluakar et al. .................. 707/8
2002/0082892 A1 6/2002 Raffel et al.
2002/0103660 A1 8/2002 Cramon et al.
2002/0104071 A1 8/2002 Charisius et al.
2002/0107826 A1 8/2002 Ramachandran et al.
2002/0120553 A1 8/2002 Bowman-Amuah
2002/0133368 A1 9/2002 Strutt et al.
2002/0138281 A1 9/2002 Cirulli et al.
2002/0138358 A1 9/2002 Scheer
2002/0143598 A1 10/2002 Scheer
2002/0156695 A1 10/2002 Edwards
2002/0161907 A1 10/2002 Moon
2002/0184111 A1 12/2002 Swanson
2002/0188486 A1 12/2002 Gil et al.
2002/0198798 A1 12/2002 Ludwig et al.
2002/0198828 A1 12/2002 Ludwig et al.
2003/0009754 A1 1/2003 Rowley et al.
2003/0058277 A1* 3/2003 Bowman-Amuah .......... 345/765
2003/0069774 A1 4/2003 Hoffman et al.
2003/0074271 A1 4/2003 Viswanath et al.
2003/0074360 A1 4/2003 Chen et al.
2003/0083762 A1 5/2003 Farrah et al.
2003/0084127 A1 5/2003 Budhiraja et al.
2003/0130860 A1 7/2003 Datta et al.
2003/0182206 A1 9/2003 Hendrix et al.
2003/0212602 A1 11/2003 Schaller
2003/0233290 A1 12/2003 Yang et al.
2004/0015367 A1 1/2004 Nicastro et al.
2004/0034578 A1 2/2004 Oney et al.
2004/0054564 A1 3/2004 Fonseca et al.
2004/0093268 A1 5/2004 Ramchandani et al.
2004/0093381 A1* 5/2004 Hodges et al. ................ 709/204
2004/0111304 A1 6/2004 Meka et al.
2004/0111639 A1 6/2004 Schwartz et al.
2004/0128180 A1 7/2004 Abel et al.
2004/0133481 A1 7/2004 Schwarze et al.
2004/0153359 A1 8/2004 Ho et al.
2004/0158506 A1 8/2004 Wille
2004/0172510 A1 9/2004 Nagashima et al.
2004/0181470 A1 9/2004 Grounds
2004/0181538 A1 9/2004 Lo et al.
2004/0205011 A1 10/2004 Northington et al.
2004/0236639 A1 11/2004 Candadai et al.
2004/0236687 A1 11/2004 Tyson-Quah
2004/0243489 A1 12/2004 Mitchell et al.
2004/0254866 A1 12/2004 Crumbach et al.
2004/0255152 A1 12/2004 Kanamori et al.
2005/0010501 A1 1/2005 Ward
2005/0033588 A1 2/2005 Ruiz et al.
2005/0044015 A1 2/2005 Bracken et al.
2005/0060235 A2 3/2005 Byrne
2005/0060408 A1 3/2005 McIntyre et al.
2005/0065828 A1 3/2005 Kroswek et al.
2005/0108680 A1 5/2005 Cheng et al.
2005/0113092 A1 5/2005 Coppinger et al.
2005/0114829 A1 5/2005 Robin et al.
2005/0125310 A1 6/2005 Hazi et al.
2005/0144125 A1 6/2005 Erbey et al.
2005/0144226 A1 6/2005 Purewal
2005/0156500 A1 7/2005 Birecki et al.
2005/0160104 A1 7/2005 Meera et al.
2005/0165784 A1 7/2005 Gomez et al.
2005/0177435 A1 8/2005 Lidow
2005/0203760 A1 9/2005 Gottumukkala et al.
2005/0203813 A1 9/2005 Welter et al.
2005/0209732 A1 9/2005 Audimoolam et al.
2005/0209943 A1 9/2005 Ballow et al.
2005/0216325 A1 9/2005 Ziad et al.
2005/0216507 A1* 9/2005 Wright ....................... 707/104.1
2005/0222896 A1 10/2005 Rhyne et al.
2005/0234787 A1* 10/2005 Wallmeier et al. ............. 705/30
2005/0235020 A1 10/2005 Gabelmann et al.
2005/0240592 A1 10/2005 Mamou et al.
2005/0246250 A1 11/2005 Murray
2005/0246482 A1 11/2005 Gabelmann et al.
2005/0256775 A1 11/2005 Schapler et al.
2005/0256882 A1 11/2005 Able et al.
2005/0257125 A1 11/2005 Roesner et al.
2005/0257197 A1* 11/2005 Herter et al. ................. 717/116
2005/0262192 A1 11/2005 Mamou et al.
2005/0262453 A1* 11/2005 Massasso ..................... 715/965
2005/0284934 A1 12/2005 Ernesti et al.
2005/0288987 A1 12/2005 Sattler et al.
2005/0289020 A1 12/2005 Bruns et al.
2005/0289071 A1* 12/2005 Goin et al. ..................... 705/56
2005/0289079 A1 12/2005 Krishan et al.
2006/0004802 A1 1/2006 Phillips et al.
2006/0053063 A1 3/2006 Nagar
2006/0064344 A1 3/2006 Lidow
2006/0074704 A1 4/2006 Shukla et al.
2006/0074731 A1 4/2006 Green et al.
2006/0080338 A1 4/2006 Seubert et al.
2006/0085243 A1 4/2006 Cooper et al.
2006/0085294 A1 4/2006 Boerner et al.
2006/0085336 A1 4/2006 Seubert et al.
2006/0089886 A1 4/2006 Wong
2006/0095439 A1 5/2006 Buchmann et al.
2006/0116930 A1* 6/2006 Goldstein ...................... 705/14
2006/0129978 A1 6/2006 Abrari et al.
2006/0143029 A1 6/2006 Akbay et al.
2006/0149574 A1* 7/2006 Bradley et al. ................... 705/1
2006/0206352 A1 9/2006 Pulianda
2006/0248504 A1 11/2006 Hughes
2006/0274720 A1 12/2006 Adams et al.
2006/0287939 A1 12/2006 Harel et al.
2006/0288350 A1 12/2006 Grigorovitch et al.
2007/0011650 A1 1/2007 Hage et al.
2007/0022410 A1 1/2007 Ban et al.
2007/0050308 A1* 3/2007 Latvala et al. ................. 705/80
2007/0075916 A1 4/2007 Bump et al.
2007/0094098 A1 4/2007 Mayer et al.
2007/0094261 A1 4/2007 Phelan et al.
2007/0129964 A1 6/2007 Helmolt et al.
2007/0129984 A1 6/2007 von Helmolt et al.
2007/0129985 A1 6/2007 Helmolt et al.
2007/0143164 A1 6/2007 Kaila et al.
2007/0150332 A1 6/2007 Grichnik et al.
2007/0150387 A1 6/2007 Seubert et al.
2007/0150855 A1* 6/2007 Jeong .......................... 717/106
2007/0156428 A1* 7/2007 Brecht-Tillinger et al. ...... 705/1
2007/0156430 A1 7/2007 Kaetker et al.
2007/0156474 A1* 7/2007 Scherberger et al. ............ 705/7
2007/0156475 A1 7/2007 Berger et al.
2007/0156476 A1 7/2007 Koegler et al.
2007/0156482 A1 7/2007 Bagheri
2007/0156489 A1 7/2007 Berger et al.

2007/0156493 A1 7/2007 Tebbe et al.
2007/0156499 A1 7/2007 Berger et al.
2007/0156500 A1 7/2007 Merkel et al.
2007/0156538 A1 7/2007 Peter et al.
2007/0156550 A1 7/2007 Der Emde et al.
2007/0156731 A1 7/2007 Ben-Zeev
2007/0162893 A1 7/2007 Moosmann et al.
2007/0164849 A1 7/2007 Haeberle et al.
2007/0168303 A1 7/2007 Moosmann et al.
2007/0174068 A1 7/2007 Alfandary et al.
2007/0174145 A1 7/2007 Hetzer et al.
2007/0174811 A1 7/2007 Kaetker et al.
2007/0186209 A1 8/2007 Kaetker et al.
2007/0197877 A1 8/2007 Decorte et al.
2007/0198391 A1 8/2007 Dreyer et al.
2007/0214065 A1 9/2007 Kahlon et al.
2007/0220046 A1 9/2007 Moosmann et al.
2007/0220143 A1 9/2007 Lund et al.
2007/0233539 A1 10/2007 Suenderhauf et al.
2007/0233541 A1 10/2007 Schorr et al.
2007/0233545 A1* 10/2007 Cala et al. ........................ 705/9
2007/0233574 A1 10/2007 Koegler et al.
2007/0233575 A1 10/2007 Berger et al.
2007/0233581 A1 10/2007 Peter
2007/0233598 A1 10/2007 Der Emde et al.
2007/0234282 A1 10/2007 Prigge et al.
2007/0239508 A1 10/2007 Fazal et al.
2007/0239569 A1 10/2007 Lucas et al.
2007/0265860 A1 11/2007 Herrmann et al.
2007/0265862 A1 11/2007 Freund et al.
2008/0004929 A9 1/2008 Raffel et al.
2008/0017722 A1 1/2008 Snyder et al.
2008/0027831 A1 1/2008 Gerhardt
2008/0065437 A1 3/2008 Dybvig
2008/0120129 A1 5/2008 Seubert et al.
2008/0147507 A1 6/2008 Langhammer
2008/0162382 A1 7/2008 Clayton et al.
2008/0208707 A1 8/2008 Erbey et al.
2008/0215354 A1 9/2008 Halverson et al.
2008/0263152 A1* 10/2008 Daniels et al. ................ 709/203
2008/0300959 A1* 12/2008 Sinha et al. .................... 705/10
2009/0037287 A1 2/2009 Baitalmal et al.
2009/0037492 A1 2/2009 Baitalmal et al.
2009/0063112 A1* 3/2009 Hader et al. ...................... 703/6
2009/0171716 A1 7/2009 Suenderhauf et al.
2009/0171818 A1* 7/2009 Penning et al. ................. 705/30
2009/0172699 A1 7/2009 Jungkind et al.
2009/0189743 A1 7/2009 Abraham et al.
2009/0192858 A1 7/2009 Johnson
2010/0070324 A1 3/2010 Bock et al.
2010/0070331 A1 3/2010 Koegler et al.
2010/0070336 A1 3/2010 Koegler et al.
2010/0070395 A1* 3/2010 Elkeles et al. .................. 705/32
2010/0070555 A1* 3/2010 Duparc et al. ................ 709/202
2010/0100464 A1 4/2010 Ellis et al.
2010/0138269 A1 6/2010 Cirpus et al.
2011/0252395 A1* 10/2011 Charisius et al. ............. 717/103

FOREIGN PATENT DOCUMENTS

WO WO 2005/114381 12/2005

OTHER PUBLICATIONS

A Formal Model for Component-Based Software: Philip T CFox, Dalhousie Uni, Halifax, canada; 0-7695-0474-4/01: pp. 304-311.*
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_aaplications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Anon.; "Sequent Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports 13,000 MAS 90 for WINDOWS Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyers' Guide to Software for Purchasing 2000.(Directory)"; Purchasing, vol. 129, No. 1; p. 179; Jul. 13, 2000.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
"Hudson's Bay Company Realizes Fast ROI with the Oracle E-Business Suite"; PR Newswire; New York; Jan. 15, 2002; p. 1.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Office Action issued in U.S. Appl. No. 11/322,772; Dec. 9, 2009; 14 pages.
Office Action issued in U.S. Appl. No. 11/322,398 on Apr. 2, 2010; 39 pages.
Office Action issued in U.S. Appl. No. 11/322,383; Nov. 12, 2009; 29 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Notice of Allowance issued in U.S. Appl. No. 11/396,259 on Mar. 29, 2010; 19 pages.
Office Action issued in U.S. Appl. No. 11/396,288; Aug. 19, 2009; 20 pages.
Office Action issued in U.S. Appl. No. 11/396,258; Nov. 25, 2009; 9 pages.

Notice of Allowance issued in U.S. Appl. No. 11/396,258 on Mar. 31, 2010; 9 pages.
Office Action issued in U.S. Appl. No. 11/396,236 on Mar. 31, 2010; 20 pages.
Office Action issued in U.S. Appl. No. 11/323,039; Sep. 4, 2009; 36 pages.
Office Action issued in U.S. Appl. No. 11/322,851; Sep. 2, 2009; 32 pages.
Office Action issued in U.S. Appl. No. 11/323,040; Jul. 24, 2009; 35 pages.
Office Action issued in U.S. Appl. No. 11/322,612; Apr. 1, 2010; 23 pages.
Office Action issued in U.S. Appl. No. 11/397,026; Jul. 21, 2009; 28 pages.
Notice of Allowance issued in U.S. Appl. No. 11/397,026 on Mar. 29, 2010; 17 pages.
Notice of Allowance issued in U.S. Appl. No. 11/967,865 on Mar. 31, 2010; 16 pages.
Office Action issued in U.S. Appl. No. 11/322,482; Jan. 7, 2010; 19 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,634; Sep. 10, 2009; 15 pages.
Office Action issued in U.S. Appl. No. 11/323,634; Apr. 2, 2010; 9 pages.
Office Action issued in U.S. Appl. No. 11/322,816; Jul. 23, 2009; 41 pages.
Office Action issued in U.S. Appl. No. 11/396,327 on Apr. 1, 2010; 26 pages.
Office Action issued in U.S. Appl. No. 12/333,085; Jun. 25, 2009; 9 pages.
Office Action issued in U.S. Appl. No. 12/333,085; Mar. 23, 2010; 5 pages.
"American Software Announces ASP Pricing Model for It's a-Applications Expense Business Solution"; PR Newswire; Mar. 6, 2000; 2 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Huang, S. et al.; "Computer-Assisted Supply Chain Configuration Based on Supply Chain Operations Reference (SCOR) Model"; Computers & Industrial Engineering 48; 2005; pp. 377-394.
Jennings et al.; "Autonomous Agents for Business Process Management"; 2000 Applied Artificial Intelligence; retrieved on Jul. 25, 2011; pp. 145-189. <http:.//citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Lockamy III, et al.; "Linking SCOR Planning Practices to Supply Chain Performance"; International Journal of Operations & Production Management; vol. 24, No. 12; 2004; pp. 1192-1218.
"Oracle Expands E-Commerce Offerings with the Acquisition of E-Travel, Inc."; PR Newswire; Mar. 9, 1999; 3 pages.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; 2004; pp. 1-208.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,236 on Oct. 28, 2010; 19 pages.
Notice of Allowance issued in U.S. Appl. No. 12/233,554 on May 14, 2010; 11 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634 on Apr. 29, 2011; 8 pages.
Office Action issued in U.S. Appl. No. 11/322,816; Apr. 15, 2010; 27 pages.
Office Action issued in U.S. Appl. No. 11/322,973 on Dec. 7, 2010; 13 pages.
Office Action issued in U.S. Appl. No. 11/322,973 on May 27, 2011; 15 pages.
Office Action issued in U.S. Appl. No. 11/322,383; May 12, 2010; 23 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.

Office Action issued in U.S. Appl. No. 12/332,965 on Oct. 11, 2011; 6 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967,483 on Aug. 20, 2010; 10 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Notice of Allowance issued in U.S. Appl. No. 12/233,534 on Jun. 24, 2010; 15 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Jun. 14, 2010; 6 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Office Action issued in U.S. Appl. No. 11/322,772; Jul. 12, 2010; 18 pages.
Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Office Action issued in U.S. Appl. No. 11/322,383 on May 12, 2010; 23 pages.
Office Action issued in U.S. Appl. No. 11/322,383 on Nov. 12, 2009; 23 pages.
Advisory Action issued in U.S. Appl. No. 11/323,041 on Jun. 7, 2010; 3 pages.
Office Action issued in U.S. Appl. No. 11/323,039; Apr. 14, 2010; 15 pages.
Advisory Action issued in U.S. Appl. No. 11/322,612; Jun. 24, 2010; 3 pages.
Notice of Allowance issued in U.S. Appl. No. 11/396,259 on Jul. 6, 2010; 6 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Notice of Allowance issued in U.S. Appl. No. 11/396,288; May 20, 2010; 15 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Office Action issued in U.S. Appl. No. 11/322,851; May 12, 2010; 15 pages.
Notice of Allowance issued in U.S. Appl. No. 11/322,851 on Sep. 2, 2011; 8 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040; Apr. 29, 2010; 17 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,458 on Oct. 12, 2011; 19 pages.
Office Action issued in U.S. Appl. No. 12/233,557 on Sep. 16, 2010; 16 pages.
Office Action issued in U.S. Appl. No. 11/967,489 on Sep. 28, 2011; 7 pages.
Office Action issued in U.S. Appl. No. 12/233,557 on Mar. 4, 2011; 19 pages.

Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Jun. 25, 2010; 16 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
"IDe Partners with Journyx to Offer Customers Best-in-Class Time Management Solution"; PR Newswire; Mar. 8, 2005; Business Dateline.
Kremic, Tibor; "Outsourcing Decision Support: A Survey of Benefits, Risks, and Decision Factor"; Supply Chain Management; V. 11; 2006; pp. 467-482.
Meseroll, Robert; "Data Mining Navy Flight"; IEEE Autotestcom 2007; Sep. 2007; pp. 476-481.
Sarjoughian et al.; "CoSMOs: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Notice of Allowance in U.S. Appl. No. 12/233,462 on Dec. 12, 2011; 6 pages.
Notice of Allowance in U.S. Appl. No. 12/233,462 on Apr. 5, 2012; 7 pages.
Office Action issued in U.S. Appl. No. 12/233,289 on Oct. 27, 2011; 15 pages.
Notice of Allowance issued in U.S. Appl. No. 12/233,289 on Feb. 15, 2012; 11 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Notice of Allowance issued in U.S. Appl. No. 12/327,701 on Apr. 6, 2012; 9 pages.
Notice of Allowance issued in U.S. Appl. No. 12/233,087 on Mar. 30, 2012; 30 pages.
Notice of Allowance issued in U.S. Appl. No. 12/233,534 won Dec. 28, 2011; 7 pages.
Notice of Allowanced issued in U.S. Appl. No. 11/322,398 on Oct. 18, 2011; 7 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Mar. 15, 2012; 7 pages.
Notice of Allowance issued in U.S. Appl. No. 11/396,250 on Dec. 7, 2011; 6 pages.
Notice of Allowance issued in U.S. Appl. No. 11/396,258 on Feb. 3, 2012; 12 pages.
Office Action issued in U.S. Appl. No. 11/396,252 on Nov. 10, 2011; 18 pages.
Notice of Allowance issued in U.S. Appl. No. 11/322,851 on Mar. 1, 2012; 9 pages.
Notice of Allowance issued in U.S. Appl. No. 11/322,845; Nov. 13, 2011; 9 pages.
Notice of Allowance issued in U.S. Appl. No. 11/397,026 on Nov. 4, 2011; 8 pages.
Notice of Allowance issued in U.S. Appl. No. 11/397,026 on Feb. 23, 2012; 8 pages.
Notice of Allowance issued in U.S. Appl. No. 12/233,520 on Nov. 10, 2011; 22 pages.
Office Action issued in U.S. Appl. No. 11/967,489 on Feb. 6, 2012; 9 pages.
Notice of Allowance issued in U.S. Appl. No. 11/967,393 on Nov. 9, 2011; 9 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.

* cited by examiner

ARCHITECTURAL DESIGN FOR OPPORTUNITY MANAGEMENT APPLICATION SOFTWARE

BACKGROUND

The subject matter of this patent application relates to computer software architecture and, more particularly, to the architecture of application software for managing opportunities.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for an opportunity management software application.

In its various aspects, the software architecture design can be implemented as methods, systems, and apparatuses, including computer program products, for implementing a software architecture design for a software application implementing ad-hoc goods movement. The application is structured as multiple process components interacting with each other through service operations, each implemented for a respective process component. The process components include a Lead Processing process component, an Opportunity Processing process component, a Customer Quote Processing process component, a Sales Order Processing process component, an Activity Management process component, and a Groupware process component.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
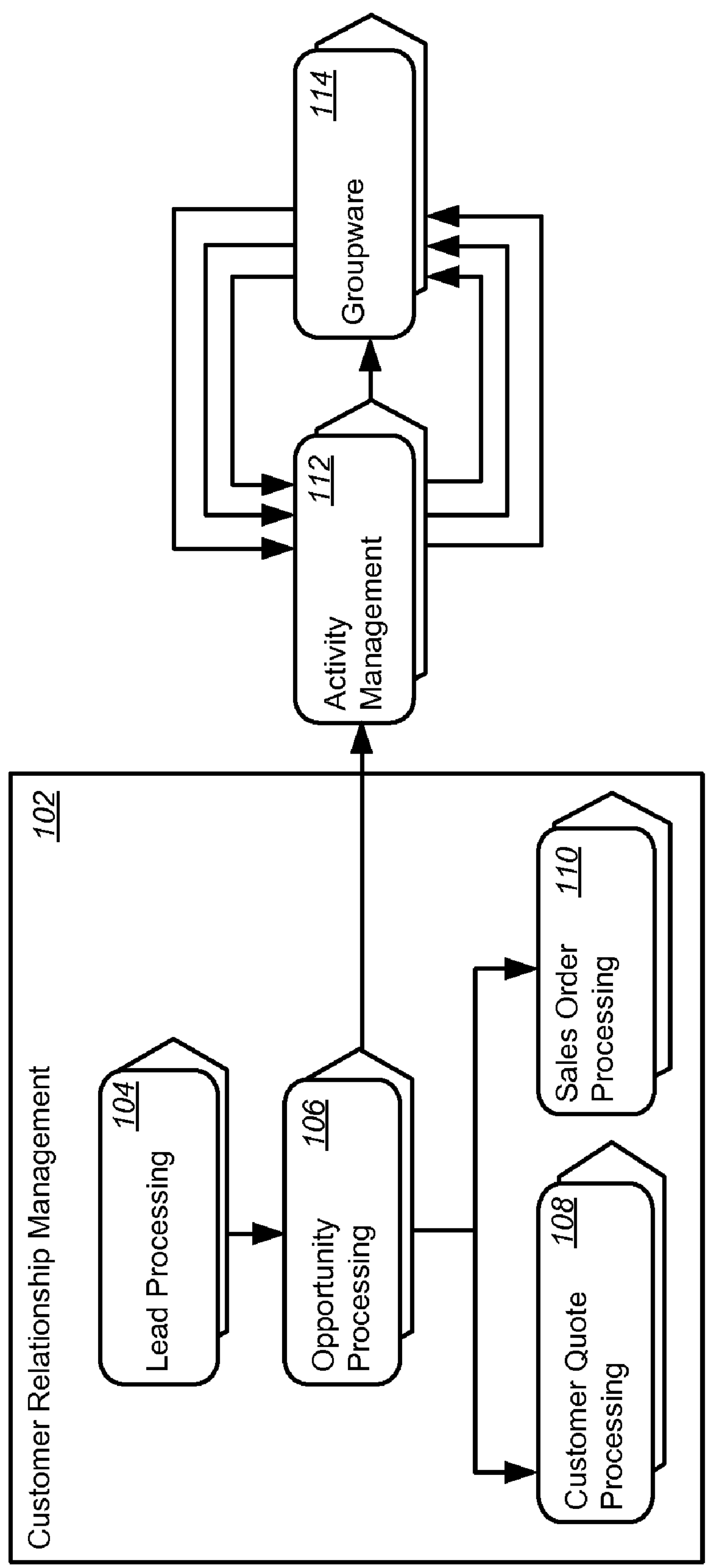
FIG. 1 is a block diagram of a software architectural design for an opportunity management software application.

FIG. 1 is a block diagram of a software architectural design for an opportunity management software application. The opportunity management application is software that develops and monitors leads and opportunities with the aim to initiate sales and service deals. This can include monitoring email, calendar events, and other sales and service related activities within an organization.

As shown in FIG. 1, the opportunity management design includes a Customer Relationship Management deployment unit 102. The Customer Relationship Management deployment unit 102 handles the management of customer-related activities within marketing, presales, sales and service. This generally includes the recording and processing of interactions throughout a customer life cycle.

The Customer Relationship Management deployment unit 102 includes a Lead Processing process component 104, an Opportunity Processing process component 106, a Customer Quote Processing process component 108, and a Sales Order Processing process component 110. The Lead Processing process component 104 handles the potential interests of a business partner and the interactions with the business partner over a certain timeframe. The Opportunity Processing process component 106 handles the development, processing, and monitoring of opportunities with the aim to initiate sales and service deals. The Customer Quote Processing process component 108 handles the processing of quotes to customers offering the delivery of goods according to specific terms. The Sales Order Processing process component 110 handles the processing of customers' requests to seller for the delivery of goods, on a specific date, for a specific quantity, and for a specific price.

The Customer Relationship Management deployment unit 102 can also employ other process components to perform opportunity management tasks. As shown in FIG. 1, these other process components include an Activity Management process component 112, and a Groupware process component 114. The Activity Management process component 112 performs the recording of activities within an organization including business activities and tasks undertaken on behalf of the organization. The Groupware process component 114 handles the integration of emails, tasks, and calendar events from a groupware server, such as Microsoft Exchange Server or Lotus Domino Server.

Figure 2:
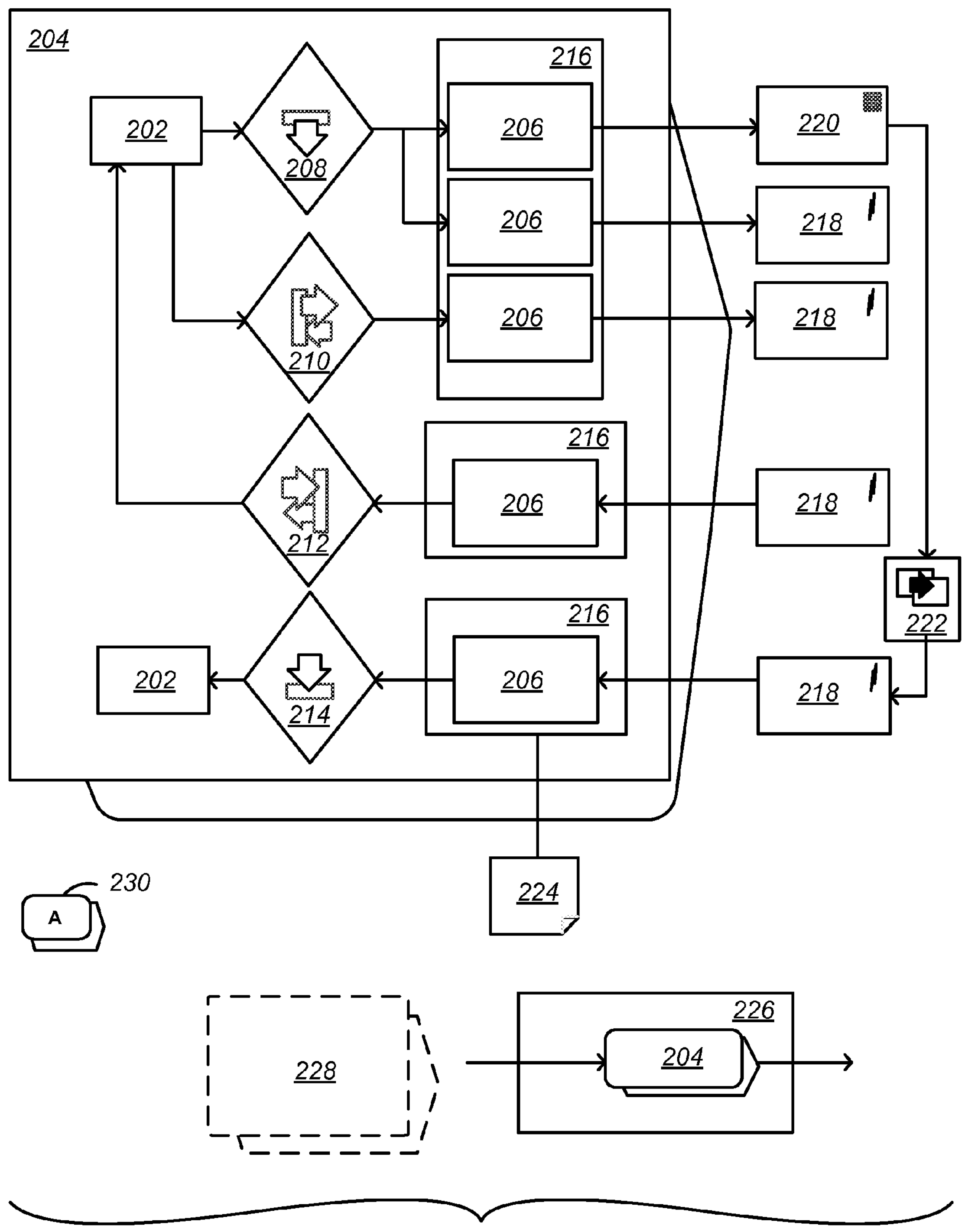
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 220) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions Between Process Components "Activity Management" and "Duet"

Figure 3:
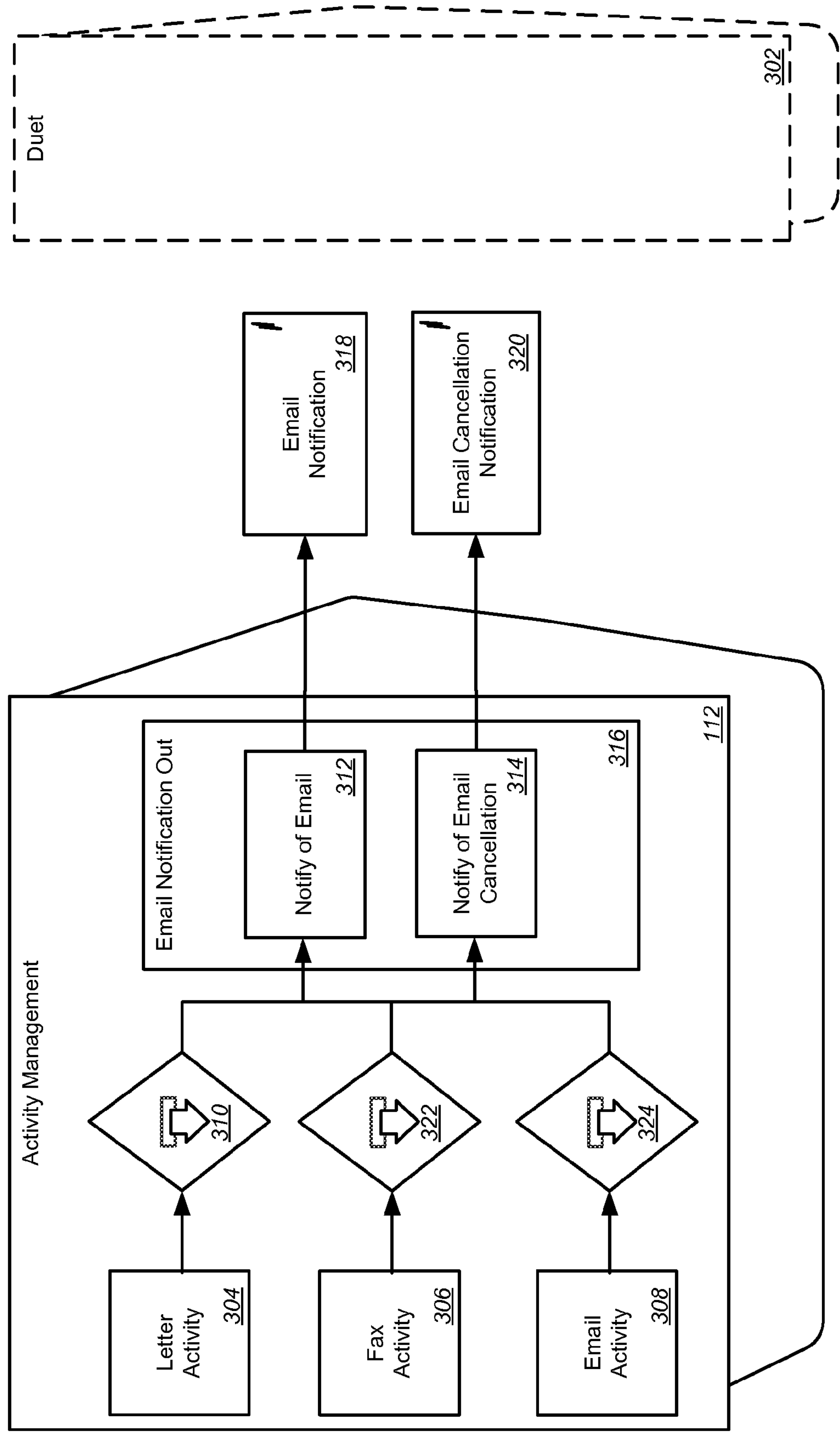
FIG. 3 is a block diagram showing interactions between an Activity Management process component and an external Duet process component relating to email.

FIG. 3 is a block diagram showing interactions between the Activity Management 112 process component and the external Duet process component 302 relating to email. The external Duet process component 302 represents an interactive add-on relating to the software solution Duet™ created by SAP and Microsoft to enable users to easily and quickly interact with business processes and data within enterprise software applications using familiar tools such as the Microsoft Office environment. In general, the Duet add-on components can provide a platform with which business applications implemented in clients use available services and components to retrieve and process data from enterprise software systems.

As shown in FIG. 3, the Activity Management process component 112 includes a Letter Activity business object 304, a Fax Activity business object 306, and an Email Activity business object 308. The Letter Activity business object 304 represents an activity that records a message, written on paper by an employee of a company on the company's behalf. The Fax Activity business object 306 represents an activity that contains documents or graphics transmitted via a telecommunications facility by an employee of a company. The Email Activity business object 308 represents an activity that contains information communicated via the Internet or an internal groupware server. In some implementations, the Email Activity business object 308 can include texts and/or attachments.

The Letter Activity business object 304 uses a Notify of Letter Activity to DUET outbound process agent 310 to invoke either a Notify of Email operation 312 or a Notify of Email Cancellation operation 314. Both operations 312 and 314 are included in an Email Notification Out interface 316. The Notify of Email operation 312 notifies the Groupware process component 114 or the DUET process component 302 about an update to letter activity, fax activity, or email activity. Similarly, the Notify of Email Cancellation operation 314 notifies a standard based Groupware or DUET about a cancellation of letter activity, fax activity, or email activity. If the Notify of Email operation 312 is invoked, an Email Notification message 318 is generated and sent to the DUET process component 302. If the Notify of Email Cancellation operation 314 is invoked, an Email Cancellation Notification message 320 is generated and sent to the DUET process component 302.

The Fax Activity business object 306 uses a Notify of Fax Activity to DUET outbound process agent 322 to invoke either the Notify of Email operation 312 or the Notify of Email Cancellation operation 314. If the Notify of Email operation 312 is invoked, the Email Notification message 318 is generated and sent to the DUET process component 302. If the Notify of Email Cancellation operation 314 is invoked, the Email Cancellation Notification message 320 is generated and sent to the DUET process component 302.

The Email Activity business object 308 uses a Notify of Email Activity to Groupware outbound process agent 324 to invoke either the Notify of Email operation 312 or the Notify of Email Cancellation operation 314. If the Notify of Email operation 312 is invoked, the Email Notification message 318 is generated and sent to the DUET process component 302. If the Notify of Email Cancellation operation 314 is invoked, the Email Cancellation Notification message 320 is generated and sent to the DUET process component 302.

Interactions Between Process Components "Duet" and "Activity Management"

Figure 4:
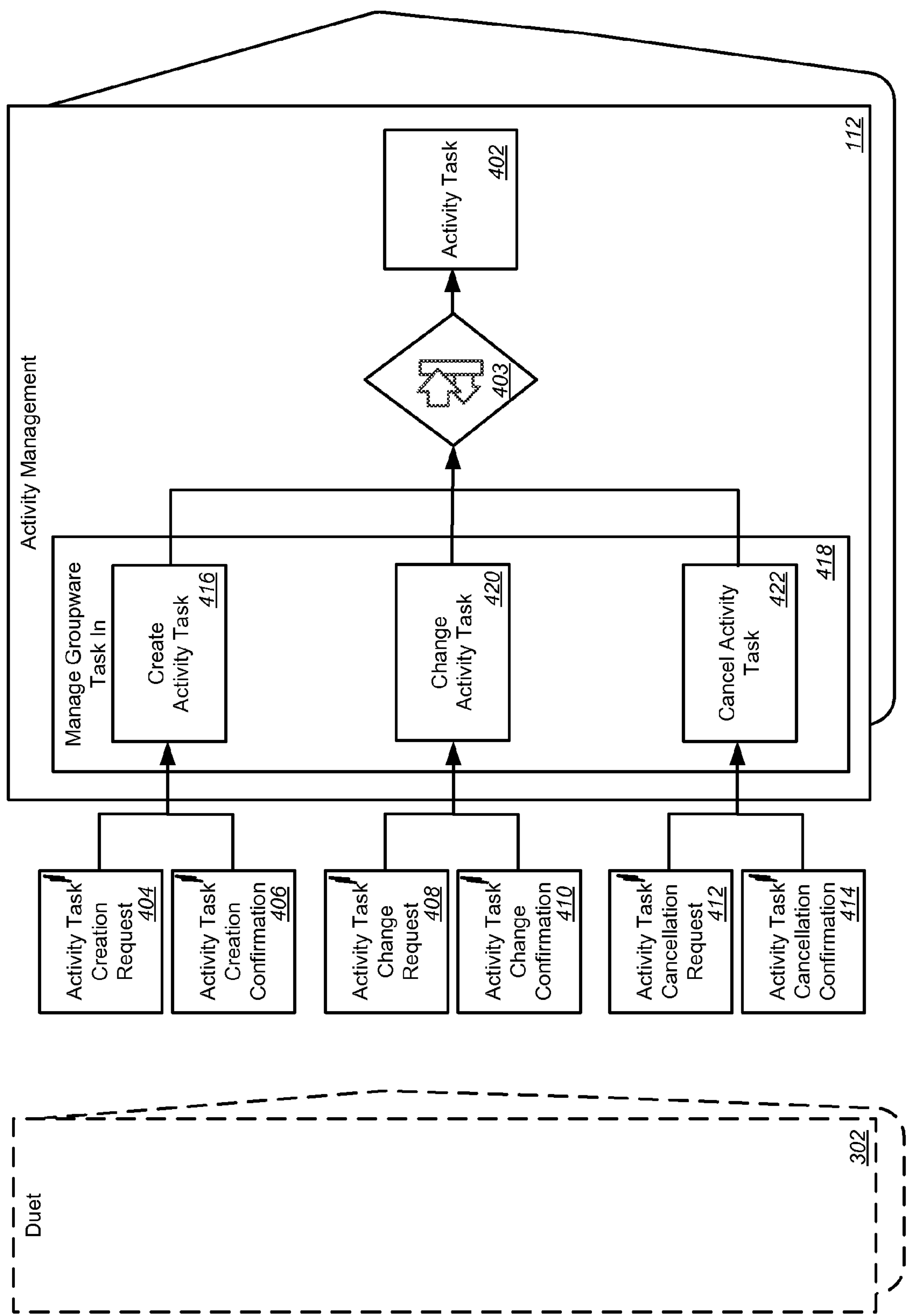
FIG. 4 is a block diagram showing interactions between the external Duet process component and the Activity Management process component relating to a groupware task.

FIG. 4 is a block diagram showing interactions between the external Duet process component 302 and the Activity Management process component 112 relating to a groupware task. Some examples of groupware tasks may include maintaining data, sending and receiving email, creating tasks, or managing a calendar. The interaction may begin when a groupware task is requested.

As shown in FIG. 4, the Activity Management process component 112 includes an Activity Task business object 402. The Activity Task business object 402 represents a task used in the Activity Management process component 112 containing information about anything an employee needs to do within a certain time frame, and which can be related to a business partner.

In general, the Activity Task business object 402 can send or receive messages from the Duet process component 302 using a Manage Activity Task based on Groupware Task synchronous inbound process agent 403. Some examples of the messages are depicted in FIG. 4. They include an Activity Task Creation Request message 404, an Activity Task Confirmation message 406, an Activity Task Change Request 408, an Activity Task Change Confirmation 410, an Activity Task Cancellation Request 412, and an Activity Task Cancellation Confirmation message 414.

In operation, the Duet process component 302 sends the Activity Task Creation Request message 404 to the Activity Management process component 112. The Activity Task Creation Request message 404 invokes a Create Activity Task operation 416 which uses the Manage Activity Task based on Groupware Task synchronous inbound process agent 403 to update the Activity Task business object 402. The Activity Task operation 416 represents a request to notify the Activity Management process component 302 about Appointment Activity based on synchronization with groupware data. The Activity Task operation 416 is included in a Manage Groupware Task In interface 418. The Activity Task business object 402 can acknowledge the receipt of the activity task creation request by sending the Activity Task Creation Confirmation message 406.

The Duet process component 302 can also send the Activity Task Change Request message 408 to the Activity Management process component 112. The Activity Task Change Request message 408 invokes a Change Activity Task operation 420 which uses the Manage Activity Task based on Groupware Task synchronous inbound process agent 403 to update the Activity Task business object 402. The Change Activity Task operation 420 represents a request to notify Activity Management about appointment activity based on synchronization with groupware data. The Activity Task business object 402 can acknowledge the receipt of the activity task change request by sending the Activity Task Change Confirmation message 410.

The Duet process component 302 can also send the Activity Task Cancellation Request message 412 to the Activity Management process component 112. The Activity Task Cancellation Request message 412 invokes a Cancel Activity Task operation 422 which uses the Manage Activity Task based on Groupware Task synchronous inbound process agent 403 to update the Activity Task business object 402. The Activity Task business object 402 can acknowledge the receipt of the activity task cancellation request by sending the Activity Task Cancellation Confirmation message 414.

Interactions Between Process Components "Groupware" and "Activity Management"

Figure 5:
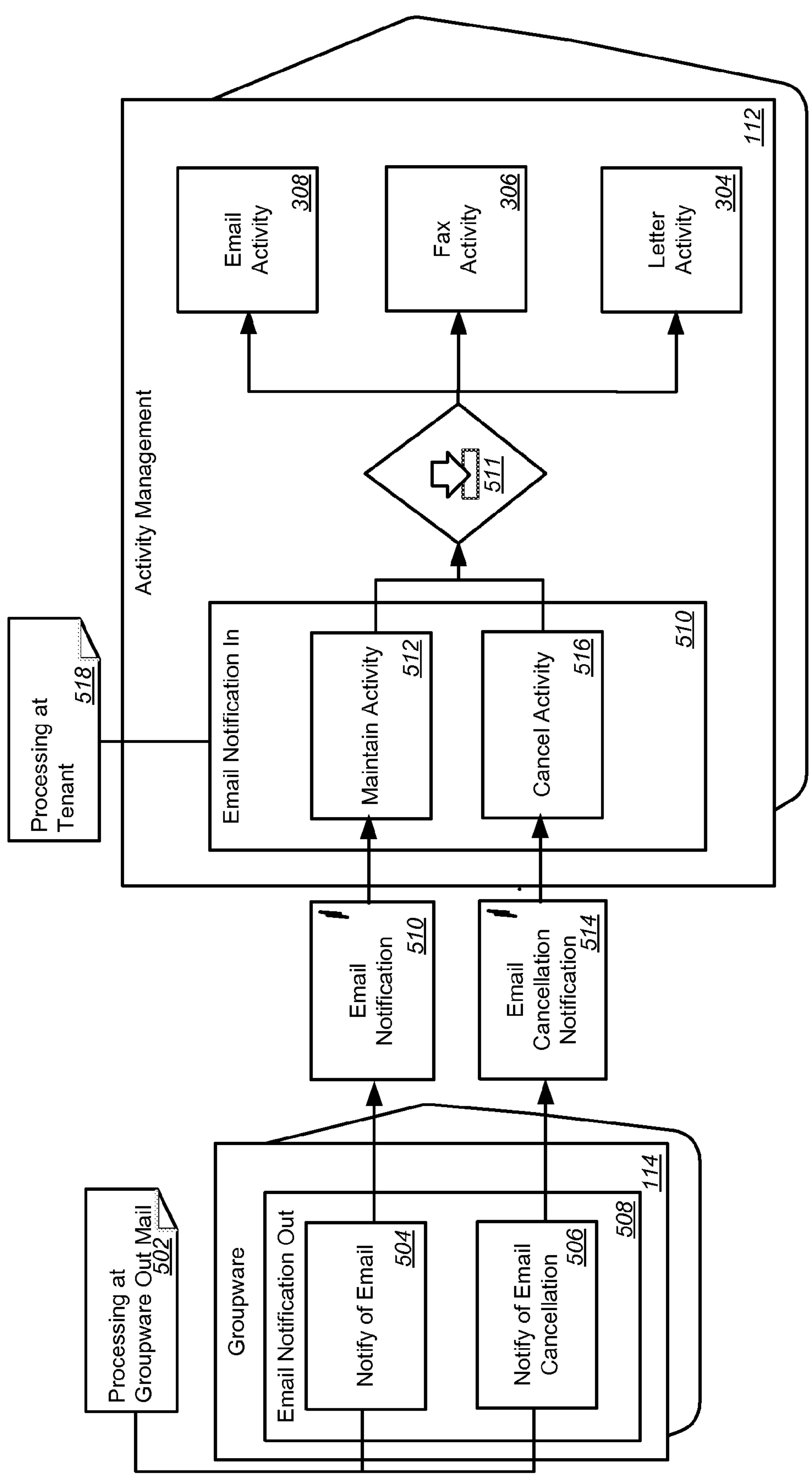
FIG. 5 is a block diagram showing interactions between a Groupware process component and the Activity Management process component.

FIG. 5 is a block diagram showing interactions between a Groupware process component 114 and the Activity Management process component 112. The interaction involves notifying the Activity Management process component 112 about the maintenance or cancellation of an email in the Groupware process component 114.

As shown in FIG. 5, the Groupware process component 114 receives template data from a Processing Groupware Out Mail communication channel template 502. The Groupware process component 114 can use data received in the template 502 to invoke either a Notify of Email operation 504 or a Notify of Email Cancellation operation 506. The Notify of Email operation 504 and the Notify of Email Cancellation operation 506 are included in an Email Notification Out interface 508. If the Notify of Email operation 504 is invoked, an Email Notification message 510 is generated and sent to the Activity Management process component 114. A Maintain Activity operation 512 receives the Email Notification message 510 and uses a Maintain Activity based on Email Transmission In inbound process agent 511 to update the Email Activity business object 308, the Fax Activity business object 306, and/or the letter Activity business object 304.

If the Notify of Email Cancellation operation 506 is invoked, an Email Cancellation Notification message 514 is generated and sent to the Activity Management process component 114. A Cancel Activity operation 516 receives the Email Cancellation Notification message 514 and uses the Maintain Activity based on Email Transmission In inbound process agent 511 to update the Email Activity business object 308, the Fax Activity business object 306, and/or the letter Activity business object 304.

The Activity Management process component 112 receives template information from a Processing at Tenant communication channel template 518. The process component 112 can utilize the template information at any time during the sending or receiving of messages.

Interactions of Process Component "Duet" and "Activity Management"

Figure 6:
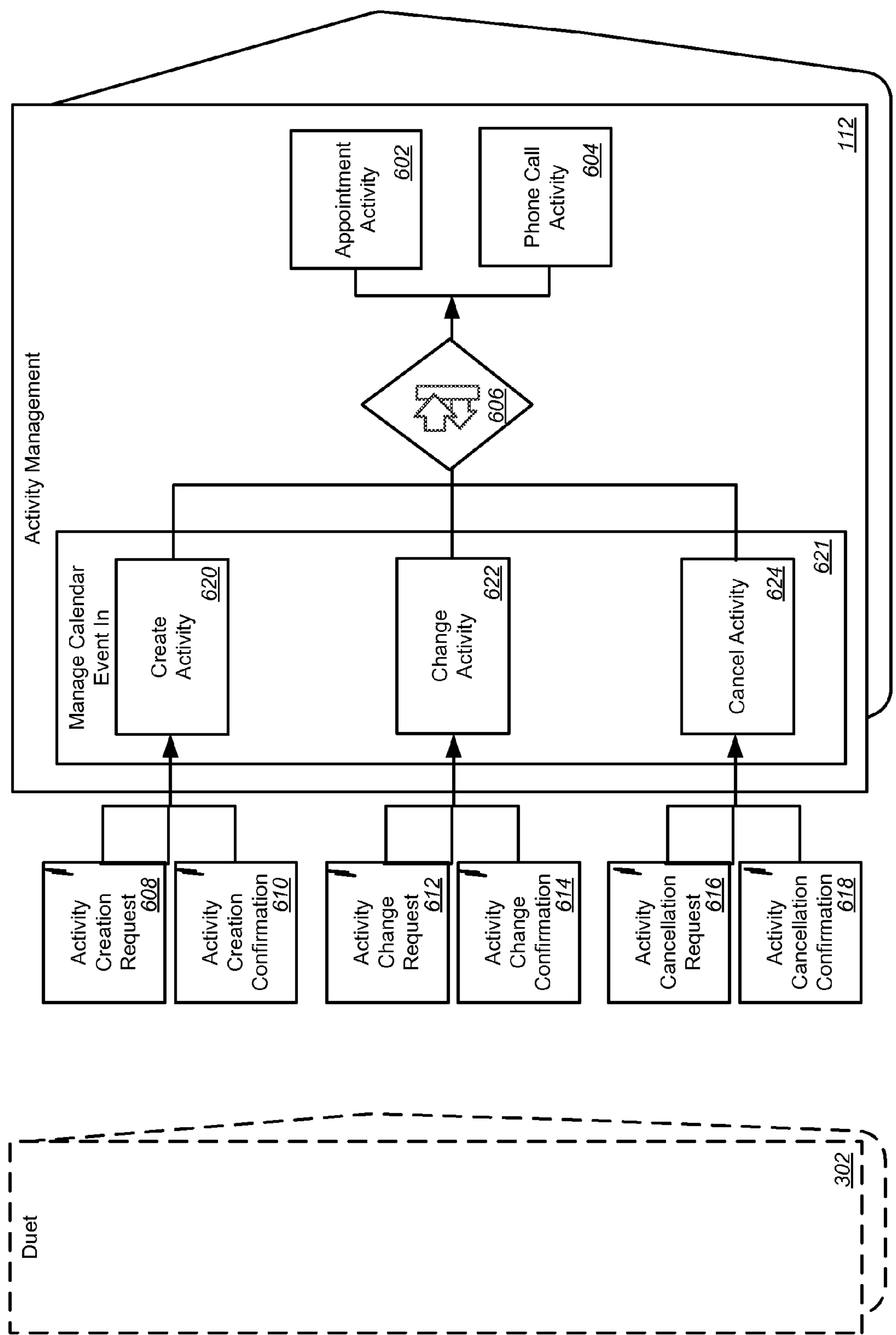
FIG. 6 is a block diagram showing interactions between the external Duet process component and the Activity Management process component relating to a calendar event.

FIG. 6 is a block diagram showing interactions between the external Duet process component 302 and the Activity Management process component 112 relating to a calendar event.

As shown in FIG. 6, the Activity Management process component 112 includes an Appointment Activity business object 602 and a Phone Call Activity business object 604. The Appointment Activity business object 602 represents a planned or unplanned activity that is maintained in a calendar of an employee of a company. It includes external appointments and scheduled meetings with other business partners. In some implementations, an appointment contains information regarding the business partner involved, the date on which the appointment is to take place, and whether the appointment is related to business, or is private in nature. The Phone Call Activity business object 604 represents an activity that records telephone interactions that are undertaken by employees on behalf of a company.

In general, both business objects 602 and 604 can send or receive messages from the Duet process component 302 using a Manage Activity Task based on Calendar Event synchronous inbound process agent 606. Some examples of the messages are depicted in FIG. 6. They include an Activity Creation Request message 608, an Activity Creation Confirmation message 610, an Activity Change Request 612, an Activity Change Confirmation 614, an Activity Cancellation Request 616, and an Activity Cancellation Confirmation message 618.

In operation, the Duet process component 302 sends the Activity Creation Request message 608 to the Activity Management process component 112. The Activity Task Creation Request message 608 invokes a Create Activity operation 620 which uses the Manage Activity Task based on Calendar Event synchronous inbound process agent 606 to update the Appointment Activity business object 602 or the Phone Call Activity business object 604. The Create Activity operation 620 is included in a Manage Calendar Event In interface 621. The business objects 602 and 604 can acknowledge the receipt of the activity creation request by sending the Activity Creation Confirmation message 610.

The Duet process component 302 can also send the Activity Change Request message 612 to the Activity Management process component 112. The Activity Change Request message 612 invokes a Change Activity operation 622 which uses the Manage Activity based on Calendar Event synchronous inbound process agent 606 to update the Appointment Activity business object 602 or the Phone Call Activity business object 604. The Appointment Activity business object 602 and the Phone Call Activity business object 604 can acknowledge the receipt of the activity change request by sending the Activity Change Confirmation message 614.

The Duet process component 302 can also send the Activity Cancellation Request message 616 to the Activity Management process component 112. The Activity Cancellation Request message 616 invokes a Cancel Activity operation 624 which uses the Manage Activity Task based on Calendar Event synchronous inbound process agent 606 to update the Appointment Activity business object 602 or the Phone Call Activity business object 604. The Appointment Activity business object 602 and the Phone Call Activity business object 604 can acknowledge the receipt of the activity cancellation request by sending the Activity Cancellation Confirmation message 618.

Interactions Between Process Components "Activity Management" and "Duet"

Figure 7:
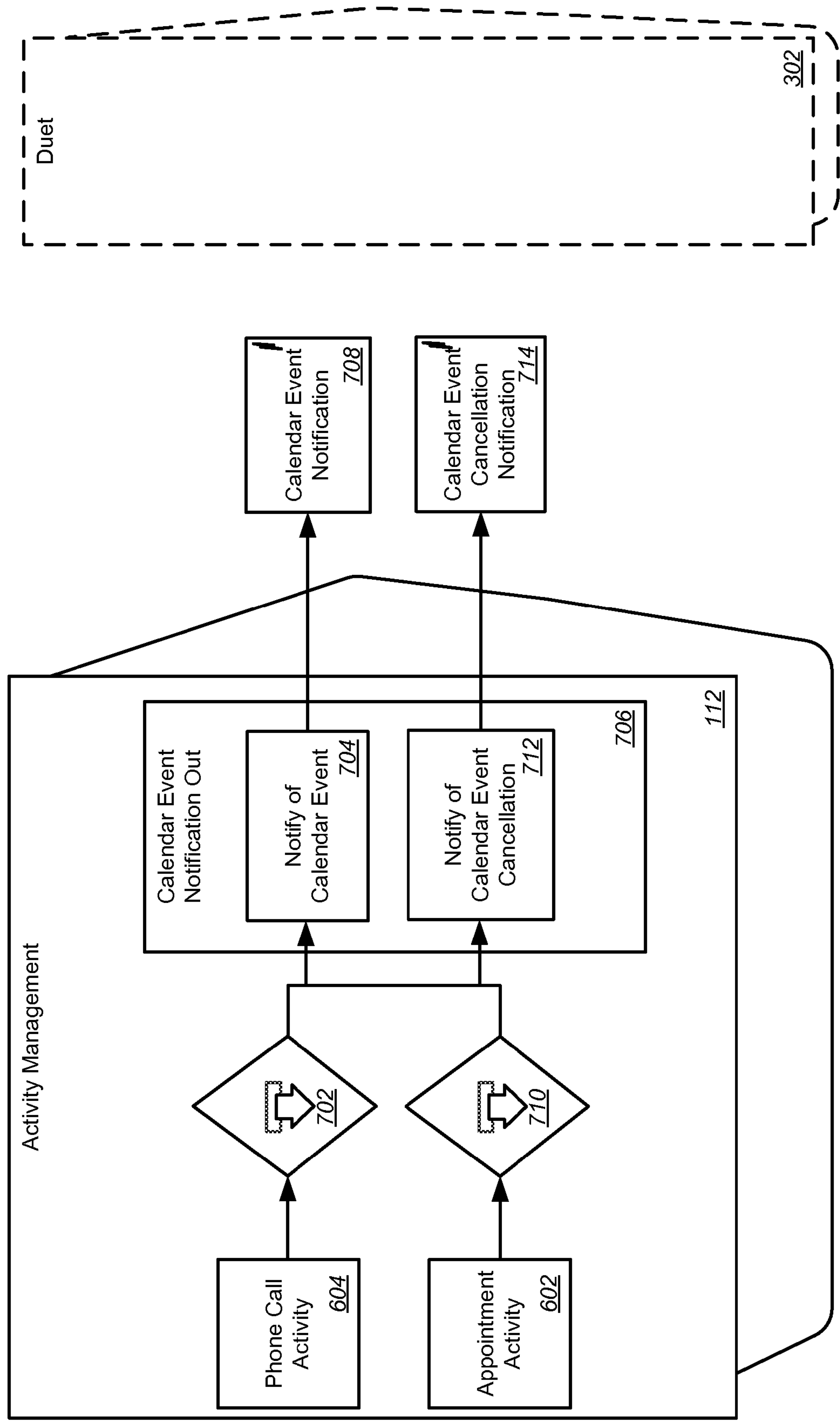
FIG. 7 is a block diagram showing interactions between the Activity Management process component and the external Duet process component relating to a calendar event.

FIG. 7 is a block diagram showing interactions between the Activity Management process component 112 and the external Duet process component 302 relating to a calendar event.

As shown in FIG. 7, the Activity Management process component 112 includes the Phone Call Activity business object 604 and the Appointment Activity business object 602. The Phone Call Activity business object 604 uses a Notify of Phone Call Activity to Duet outbound process agent 702 to invoke a Notify of Calendar Event operation 704. The Notify of Calendar Event operation 704 is included in a Calendar Event Notification Out interface 706. The Notify of Calendar Event operation 704 sends a Calendar Event Notification message 708 to the Duet process component 302.

The Appointment Activity business object 602 uses a Notify of Appointment Activity to Groupware outbound process agent 710 to invoke a Notify of Calendar Event Cancellation operation 712. The Notify of Calendar Event Cancellation operation 712 is included in the Calendar Event Notification Out interface 706. The Notify of Calendar Event Cancellation operation 712 sends a Calendar Event Cancellation Notification message 714 to the Duet process component 302.

Interactions Between Process Components "Activity Management" and "Duet"

Figure 8:
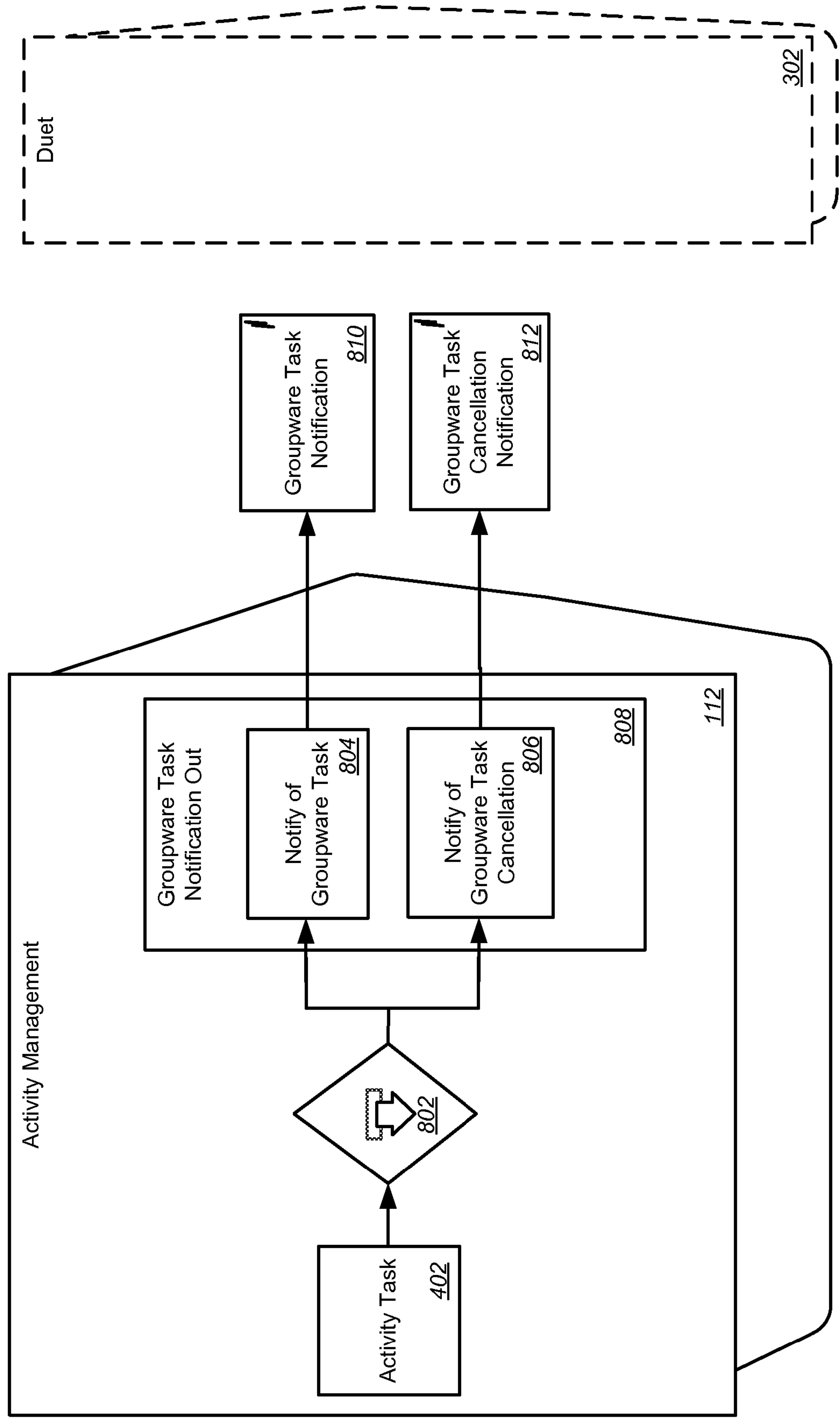
FIG. 8 is a block diagram showing interactions between the Activity Management process component and the external Duet process component relating to a task.

FIG. 8 is a block diagram showing interactions between the Activity Management process component 112 and the Duet process component 302 relating to a task. The Activity Management process component 112 includes the Activity Task business object 402. The business object 402 uses a Notify of Activity Task to Groupware outbound process agent 802 to invoke either a Notify of Groupware Task operation 804 or a Notify of Groupware Task Cancellation operation 806. The operations 804 and 806 are included in a Groupware Task Notification Out interface 808. If the Notify of Groupware Task operation 804 is invoked, a Groupware Task Notification message 810 is generated. If the Notify of Groupware Task Cancellation operation 806 is invoked, a Groupware Task Cancellation Notification 812 is generated.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in apportion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as an exemplification of preferred embodiments of the present disclosure. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions operable when executed by at least one processor to:

define a plurality of process components, each of the process components comprising a modular and application-independent package of reusable, granular software implementing a respective and distinct business process, the business process comprising functionality exposed by the process component via a corresponding service interface, the plurality of process components including:

a lead processing process component for handling potential interests of a business partner and interactions with the business partner over a certain timeframe;

an opportunity processing process component for handling development, processing, and monitoring of opportunities;

a customer quote processing process component for handling processing of quotes to customers offering the delivery of goods according to specific terms;

a sales order processing process component for handling processing of customers' requests to seller for the delivery of goods, on a specific date, for a specific quantity, and for a specific price;

an activity management process component for handling recording of activities within an organization;

a groupware process component for handling integration of emails, tasks, and calendar events from a groupware server; and a duet process component for providing a platform for allowing client-implemented business applications to use available enterprise software platform services and components to retrieve process and synchronize data with enterprise software systems; and define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the groupware process component and the activity management process component, where the pair-wise interaction between the groupware process component and the activity management process component includes the transmission of:

an email notification message from the groupware process component to the activity management process component, the email notification message comprising a notification to the activity management process component of new template data associated with a new email from the groupware server; and an email cancellation notification message from the groupware process component to the activity management process component, the email cancellation notification message comprising a notification to the activity management process component of cancellation of a previously-notified email from the groupware server;

the activity management process component and the duet process component, where the pair-wise interaction between the activity management process component and the duet process component includes the transmission of:

an activity creation request message from the duet process component to the activity management process component, the activity creation request message comprising a request to update an appointment activity or a phone call activity at the activity management process component;

an activity change request message from the duet process component to the activity management process component, the activity change request message comprising a request to modify a previously created appointment activity or phone call activity with new information;

an activity cancellation request message from the duet process component to the activity management process component, the activity cancellation request message comprising a request to cancel a previously created appointment activity or phone call activity;

the duet process component and the activity management process component relating to a groupware task, where the pair-wise interaction between the duet process component and the activity management process component includes the transmission of:

an activity task creation request message from the duet process component to the activity management process component, the activity task creation request message comprising a request to create an activity task based on synchronization with groupware data received from the duet process component;

an activity task change request message from the duet process component to the activity management process component, the activity task change request message comprising a request to update a previously generated activity task based on synchronization with groupware data; and an activity task cancellation request message from the duet process component to the activity management process component, the activity task cancellation request message comprising a request to cancel a previously generated activity task based on synchronization with groupware data; and the duet process component and the activity management process component relating to a calendar event, where the pair-wise interaction between the duet process component and the activity management process component includes the transmission of:

a calendar event notification message from the activity management process component to the duet process component, the calendar event notification message comprising a notification to the duet process component of a calendar event created within the activity management process component; and a calendar event cancellation notification message from the activity management process component to the duet process component, the calendar event cancellation notification message comprising a notification of cancellation of a previously created calendar event within the duet process component.

2. The product of claim 1, wherein:

each of the plurality of process components is assigned to exactly one deployment unit among multiple deployment units, and each deployment unit is deployable on a separate computer hardware platform independent of every other deployment unit; and all interaction between a process component in one deployment unit and any other process component in any other deployment unit takes place through the respective service interfaces of the two process components.

3. The product of claim 2, wherein the deployment units comprise:

a customer relationship management deployment unit that includes the lead processing process component, the opportunity processing process component, the customer quote processing process component, and the sales order processing process component.

4. The product of claim 1, wherein:

each of the process components includes one or more business objects; and none of the business objects of any one of the process components interacts directly with any of the business objects included in any of the other process components.

5. The product of claim 4, wherein the business objects comprise a business process object.

6. The product of claim 4, wherein none of the business objects included in any one of the process components is included in any of the other process components.

7. The product of claim 1, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

8. The product of claim 7, wherein each inbound process agent comprises a first inbound process agent operable to start an execution of a business process step requested in a first inbound message by creating or updating at least one business object instance.

9. The product of claim 7, wherein the outbound process agents comprise a first asynchronous outbound process agent that is called after a business object that is associated with the first outbound process agent changes.

10. The product of claim 1, wherein the operations comprise synchronous and asynchronous operations.

11. A system, comprising:

a computer system comprising at least one hardware platform for executing computer instructions, the computer instructions structured as a plurality of process components interacting with each other through service interfaces, each hardware platform including at least one processor for executing the computer instructions;

at least one memory storing a plurality of process components executable by the respective processor of the particular hardware platform, each of the process components comprising a modular and application-independent package of reusable granular software implementing a respective and distinct business process, the business process comprising functionality exposed by the process component via at least one service interface, the plurality of process components including:

a lead processing process component for handling potential interests of a business partner and interactions with the business partner over a certain timeframe;

an opportunity processing process component for handling development, processing, and monitoring of opportunities;

a customer quote processing process component for handling processing of quotes to customers offering the delivery of goods according to specific terms;

a sales order processing process component for handling processing of customers' requests to seller for the delivery of goods, on a specific date, for a specific quantity, and for a specific price;

an activity management process component for handling recording of activities within an organization;

a groupware process component for handling integration of emails, tasks, and calendar events from a groupware server; and a duet process component for providing a platform for allowing client-implemented business applications to use available enterprise software platform services and components to retrieve, process, and synchronize data with enterprise software systems; and the memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the groupware process component and the activity management process component, where the pair-wise interaction between the groupware process component and the activity management process component includes the transmission of:

an email notification message from the groupware process component to the activity management process component, the email notification message comprising a notification to the activity management process component of new template data associated with a new email from the groupware server; and an email cancellation notification message from the groupware process component to the activity management process component, the email cancellation notification message comprising a notification to the activity management process component of cancellation of a previously-notified email from the groupware server;

the activity management process component and the duet process component, where the pair-wise interaction between the activity management process component and the duet process component includes the transmission of:

an activity creation request message from the duet process component to the activity management process component, the activity creation request message comprising a request to update an appointment activity or a phone call activity at the activity management process component;

an activity change request message from the duet process component to the activity management process component, the activity change request message comprising a request to modify a previously created appointment activity or phone call activity with new information;

an activity cancellation request message from the duet process component to the activity management process component, the activity cancellation request message comprising a request to cancel a previously created appointment activity or phone call activity;

the duet process component and the activity management process component relating to a groupware task, where the pair-wise interaction between the duet process component and the activity management process component includes the transmission of:

an activity task creation request message from the duet process component to the activity management process component, the activity task creation request message comprising a request to create an activity task based on synchronization with groupware data received from the duet process component;

an activity task change request message from the duet process component to the activity management process component, the activity task change request message comprising a request to update a previously generated activity task based on synchronization with groupware data; and an activity task cancellation request message from the duet process component to the activity management process component, the activity task cancellation request message comprising a request to cancel a previously generated activity task based on synchronization with groupware data; and the duet process component and the activity management process component relating to a calendar event, where the pair-wise interaction between the duet process component and the activity management process component includes the transmission of:

a calendar event notification message from the activity management process component to the duet process component, the calendar event notification message comprising a notification to the duet process component of a calendar event created within the activity management process component; and a calendar event cancellation notification message from the activity management process component to the duet process component, the calendar event cancellation notification message comprising a notification of cancellation of a previously created calendar event within the duet process component.

12. The system of claim 11, wherein:

each of the process components includes one or more business objects; and none of the business objects of any one of the process components interacts directly with any of the business objects included in any of the other process components.

13. The system of claim 11, wherein none of the business objects included in any one of the process components is included in any of the other process components.

14. The system of claim 11, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

15. The system of claim 11, the system comprising one hardware platforms, wherein:

the lead processing process component, the opportunity processing process component, the customer quote processing process component, and the sales order processing process component are deployed on one hardware platform.

16. A computer-implemented method for developing a computer software application, the method comprising the following steps performed by at least one processor:

obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable granular software implementing a respective and distinct business process, the business process comprising functionality exposed by the process component, and the design further specifying a set of process component interactions based on messages transmitted between two or more of the process components, wherein:

the specified process components include:

a lead processing process component for handling potential interests of a business partner and interactions with the business partner over a certain timeframe;

an opportunity processing process component for handling development, processing, and monitoring of opportunities;

a customer quote processing process component for handling processing of quotes to customers offering the delivery of goods according to specific terms;

a sales order processing process component for handling processing of customers' requests to seller for the delivery of goods, on a specific date, for a specific quantity, and for a specific price;

an activity management process component for handling recording of activities within an organization;

a groupware process component for handling integration of emails, tasks, and calendar events from a groupware server; and a duet process component for providing a platform for allowing client-implemented business applications to use available enterprise software platform services and components to retrieve, process, and synchronize data with enterprise software systems; and the process component interactions include interactions between:

the groupware process component and the activity management process component, where the pair-wise interaction between the groupware process component and the activity management process component includes the transmission of:

an email notification message from the groupware process component to the activity management process component, the email notification message comprising a notification to the activity management process component of new template data associated with a new email from the groupware server; and an email cancellation notification message from the groupware process component to the activity management process component, the email cancellation notification message comprising a notification to the activity management process component of cancellation of a previously-notified email from the groupware server;

the activity management process component and the duet process component, where the pair-wise interaction between the activity management process component and the duet process component includes the transmission of:

an activity creation request message from the duet process component to the activity management process component, the activity creation request message comprising a request to update an appointment activity or a phone call activity at the activity management process component;

an activity change request message from the duet process component to the activity management process component, the activity change request message comprising a request to modify a previously created appointment activity or phone call activity with new information;

an activity cancellation request message from the duet process component to the activity management process component, the activity cancellation request message comprising a request to cancel a previously created appointment activity or phone call activity;

the duet process component and the activity management process component relating to a groupware task, where the pair-wise interaction between the duet process component and the activity management process component includes the transmission of:

an activity task creation request message from the duet process component to the activity management process component, the activity task creation request message comprising a request to create an activity task based on synchronization with groupware data received from the duet process component;

an activity task change request message from the duet process component to the activity management process component, the activity task change request message comprising a request to update a previously generated activity task based on synchronization with groupware data; and an activity task cancellation request message from the duet process component to the activity management process component, the activity task cancellation request message comprising a request to cancel a previously generated activity task based on synchronization with groupware data; and the duet process component and the activity management process component relating to a calendar event, where the pair-wise interaction between the duet process component and the activity management process component includes the transmission of:

a calendar event notification message from the activity management process component to the duet process component, the calendar event notification message comprising a notification to the duet process component of a calendar event created within the activity management process component; and a calendar event cancellation notification message from the activity management process component to the duet process component, the calendar event cancellation notification message comprising a notification of cancellation of a previously created calendar event within the duet process component; and generating, using the at least one processor on the computer system, a computer software application to perform the set of processes based on the obtained design including the specified process components and the specified process component interactions.

17. The method of claim 16, wherein each process in the set of processes is a business process transforming a defined business input into a defined business outcome.

18. The method of claim 17, wherein obtaining digital data representing the architectural design further comprises editing the design before using the design.

* * * * *